Sept. 30, 1958 H. G. ABBEY 2,854,159
SKIP TRANSFER CONVEYERS
Filed Aug. 1, 1956 10 Sheets-Sheet 1

INVENTOR.
HAROLD G. ABBEY
BY
Kenyon & Kenyon
ATTORNEYS

Sept. 30, 1958  H. G. ABBEY  2,854,159
SKIP TRANSFER CONVEYERS
Filed Aug. 1, 1956  10 Sheets-Sheet 2

Fig. 3B.

INVENTOR.
HAROLD G. ABBEY
BY
Kenyon & Kenyon
ATTORNEYS

Sept. 30, 1958   H. G. ABBEY   2,854,159
SKIP TRANSFER CONVEYERS
Filed Aug. 1, 1956   10 Sheets-Sheet 4

INVENTOR.
HAROLD G. ABBEY
BY
Kenyon & Kenyon
ATTORNEYS

Sept. 30, 1958 H. G. ABBEY 2,854,159
SKIP TRANSFER CONVEYERS
Filed Aug. 1, 1956 10 Sheets-Sheet 8

INVENTOR.
HAROLD G. ABBEY
BY
ATTORNEYS

Sept. 30, 1958 H. G. ABBEY 2,854,159
SKIP TRANSFER CONVEYERS
Filed Aug. 1, 1956 10 Sheets-Sheet 10

INVENTOR.
HAROLD G. ABBEY
BY
ATTORNEYS

United States Patent Office 2,854,159
Patented Sept. 30, 1958

2,854,159

SKIP TRANSFER CONVEYERS

Harold G. Abbey, Jamaica, N. Y.

Application August 1, 1956, Serial No. 601,461

13 Claims. (Cl. 214—89)

The present invention relates generally to conveyers of the type including an overhead track from which several work carriers are suspended for conveyance to a series of work stations below the track, and more particularly to an efficient conveyer arrangement wherein a given work carrier may be lowered or otherwise removed from the track for processing at a selected station without blocking or interrupting the continued travel of other carriers along said track. This application is a continuation-in-part of the pending patent application, Serial No. 576,588, filed April 6, 1956, now abandoned.

In conveyer structures of conventional design, such as are presently used in conjunction with automatic plating and liquid processing machines, articles or pieces to be plated or processed are conveyed on carriers along a straight line or looped track from the input end of the machine to the output terminal thereof. Work stations are situated below the track, the stations usually taking the form of tanks containing plating, processing or rinsing solutions. In operation the carriers are lowered by a hoist or other means from the track into the tank to immerse the articles therein for processing.

Inasmuch as the several carriers are placed on the track in a given sequence, with standard conveyer arrangements the progress of any one carrier along the track from station to station must await that of the preceding carriers. For example, in plating a plurality of workpieces simultaneously, if the load on a first carrier has been lowered for processing in a given tank the transfer of a second carrier must necessarily be delayed until such time as the processing is completed and the first carrier advanced to clear passage for the second carrier. The time down in cell plating, loading or any other operation is normally different in each instance, hence the advance of the carriers from station to station can be no faster than the longest operation in the sequence. This factor acts as a production bottleneck and materially slows down the operation of the automatic machine. Moreover it results in a relatively low production rate and adds substantially to plating costs.

In view of the foregoing, it is the principal object of the invention to provide an improved conveyer structure for a plurality of work carriers whereby any one carrier may be transferred from the track to a work station without disrupting the travel of the following carriers. A conveyer in accordance with the invention obviates the disadvantages of the prior art devices and gives rise to substantial savings in time and space when plating a plurality of workpieces simultaneously or when carrying out any other multi-step operation. The invention makes possible an automation system which is self-regulating and wherein processing, testing and inspection of workpieces may be carried out uninterruptedly in any desired sequence.

More specifically, it is an object of the invention to provide a conveyer whose overhead track includes removable rail segments each of which may be lowered or otherwise displaced to transfer a carrier to a work station, the lowered segment being automatically replaced by a substitute rail segment which restores continuity to the trackway, thereby permitting passage of other carriers. The insertion of the substitute segment which may be effected by lateral, vertical or angular motion is made concurrent with the lowering action of the transfer rail segment so that no time is lost in closing the gap in the trackway.

The substitute segment precludes the possibility of a carrier dropping through the track opening. The arrangement is such that when the transfer segment is lifted or otherwise shifted to return the work carrier to the trackway, the substitute segment is automatically restored to its inactive position. Thus the trackway is available for conveyance at all times and undue delays are not encountered in operation.

Also an object of the invention is to provide a conveyer arrangement wherein work carriers may be skip transferred, that is, selectively and automatically removed from work stations in any desired order without regard to their relative position in the carrier series.

As applied to plating operation, the conveyer makes it possible automatically to transfer a work carrier to work stations vacated by plated parts irrespective of the carrier position in the sequence thereof on the track. Thus a plating barrel may remain at rest in a processing tank for a period sufficient to produce a required deposit. It enables the most efficient utilization of preliminary tanks, such as cleaning and rinsing tanks which entail much shorter dwell periods. It is to be understood, however, that the conveyer is by no means limited to plating operation and may be used wherever a series of operations are to be performed at a plurality of work stations to effect automation of a production process.

A further object of the invention is to provide a conveyer including a trackway whose removable rail segments may each be lowered or lifted with respect to a work station by an individual elevator whereby the time down may be selected and set at will. Thus any multiple of the interval time between transfers may be set and such settings varied as desired without any physical change in the machine.

Another object of the invention is to provide a lever and latching arrangement adapted accurately to locate, center and prevent movement of the carrier during the positioning and lowering of the carrier.

Yet another object of the invention is to provide a multiple cell processing arrangement wherein work carriers may be transferred from a main trackway to an auxiliary trackway for movement through multiple cell baths and then returned to the main trackway for continued processing.

Still another object of the invention is to provide a conveyer of high operating efficiency, and which is reliable in operation.

Briefly stated, a conveyor structure according to one preferred embodiment of the invention is comprised of a plurality of work carriers conveyable on an overhead track for travel to various work stations therebelow, the track including removable rail segments vertically aligned with said stations. Individual elevators are provided for the removable segments to lower same to a work station. For each removable segment there is also provided a substitute segment which automatically replaces the removable segment when it is lowered and serves to re-establish the continuity of the track and thereby permit passage of the carriers. The removable and substitute segments are in vertically superposed relation, whereby the lowering action of the former to a point below the track concurrently lowers the substitute segment into its track position. Thus, no gaps are permitted to remain in the track and the flow of traffic thereon is never interrupted, For a better understanding of the invention as well as other objects and further features thereof, reference is had to the following detailed description to be read in conjunction with the accompanying drawings, wherein like components in the various views are identified by like reference numerals.

Figure 1:
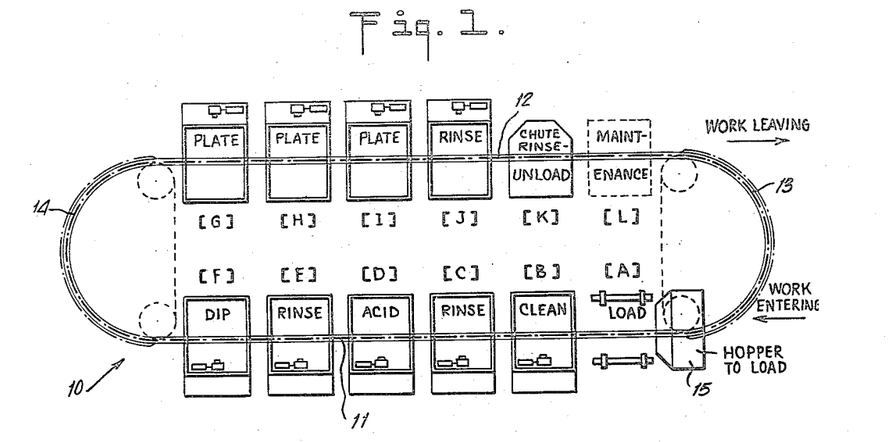
Fig. 1 is a plan view in somewhat schematic form of an automatic plating machine embodying a first embodiment of a conveyor mechanism in accordance with the invention.
Figure 2:
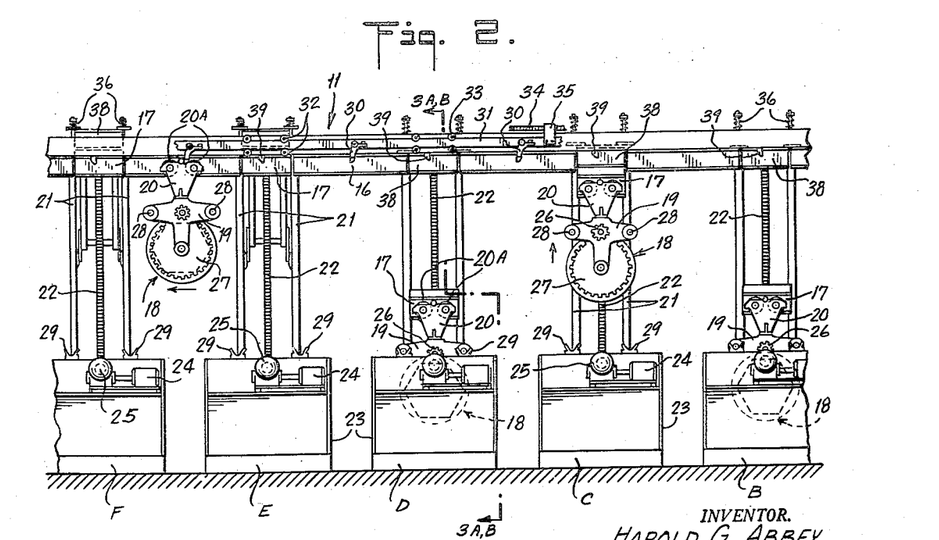
Fig. 2 is a front elevational view of the machine shown in Fig. 1.

Referring now to Figs. 1 and 2, there is shown the general arrangement and operation of a continuous line plating machine embodying a conveyor 10 according to the invention, the conveyer being constituted by two parallel straight line track sections 11 and 12 whose ends are effectively linked by arcuate track sections 13 and 14. At spaced locations below track section 11 are six work stations A to F, while below the opposing track section 12 are work stations G to H. The invention while illustrated with a track loop is also applicable to straight line operation.

Work pieces entering the machine are supplied to a loading chute or hopper 15 whose contents are then dumped into the work cylinders or barrels at the loading station A. From station A, the carriers are transferred to work station B where the articles are chemically cleaned or electrocleaned as desired. Cold water rinsing is carried out at station C. For this purpose a plain steel tank with a dam overflow may be used.

At station D, the articles are subjected to pickling in a suitable acid bath, the tank therefor being lined with an acid-resistant material. After pickling, the articles are cold water rinsed at work station E and here too the tanks must be lined with acid-resistant material, such as lead. Cyanide or acid dip is effected at station F.

Stations G, H and I are reserved for plating operations, and for this purpose separate or a single multi-segmented tank may be used. Obviously, any desired number of stations may be employed for this purpose. At station J the plated work is cold water rinsed from which point it is transferred to station K where it is hot water rinsed in a chute and unloaded. Station L may be used for maintenance operation on the conveyer or it may be constituted by a dryer for the plated articles.

Thus, in travelling from station A to L a complete plating cycle is effected. By means of the conveyer, the various processing steps are carried out automatically and with maximum dispatch. The plating operations, per se, are conventional and form no part of the invention. They do serve, however, to illustrate the functioning of the conveyer, and the manner in which skip transfer is executed within the context of a plating machine.

As shown in Fig. 2, the overhead track 11 is constituted by a fixedly supported "I" beam 16 acting as a monorail and including transfer rail segments 17 which normally are in linear registration with the trackway but are removable therefrom. The rail segments 17, as shown in Fig. 2, are in vertical alignment with the work stations therebelow. The rail may be in various forms, depending on the type of carrier employed. Thus the rail may be constituted by hollow tubing, an inverted T section, a round bar or a rectangular bar. A double rail track may also be used in lieu of a monorail structure.

Travelling along the monorail are work carriers in the form of perforated cylindrical plating barrels 18 of non-conductive material, such as hard rubber, Lucite or melamine. The barrels are rotatably supported between the dependent arms of a yoke member 19. The conveyer may be used in conjunction with all types of cellular liquid treatment. For non-electrolytic treatments (phosphating) metal cylinders may be used in place of the non-metallic barrels.

Yoke 19 is suspended below a trolley 20 having two sets of wheels 20A which ride on either side of the lower flange of the rail 16 to transport the barrel to selected stations. While a wheeled trolley is shown herein, this is only necessary for heavy duty operations. It is to be understood that slidetype trolleys may be used on light duty work.

Each transfer rail segment 17 is movable downwardly by means of an individual elevator having vertical frame beams 21 and a continuous chain 22 to which the transfer segment is mechanically coupled, so that when the chain is driven the segment may be lowered or raised thereby depending on the direction of drive. When the rail segment is lowered with a work carrier thereon, the plating barrel 18 is immersed in a processing tank 23 at the work station. Mounted adjacent the end wall of the tank is a drive motor 24 for rotating the barrel through a speed reducer 25 whose output gear intermeshes with a drive gear 26 projecting from one end of the yoke 19 and operatively coupled to the barrel gear 27. Also projecting from opposing ears on the yoke are two electrodes or horns 28 which when the barrel is lowered into the tank are seated in and electrically engage with contact saddles 29 to supply plating current in the usual manner.

The trolleys 20 of the several work carriers are indexed or shifted in a stepwise manner along the monorail in one direction by means of spaced pusher fingers 30 which are pivotally connected to a reciprocally operated actuator bar 31 disposed above the rail and parallel thereto. The bar 31 is slideably supported between rollers 32 or 33 and is driven by an intermittently operated chain 34 to which it is coupled by means of suitable straps 35. The chain is driven in alternate directions at timed intervals.

Resiliently supported above each transfer rail segment by means of helical springs 36 is a substitute rail segment 38 which is an exact duplicate of segment 17. The arrangement is such that when the transfer segment 17 is lowered the substitute segment 38 is urged by the springs downwardly in place of the transfer segment so that no break exists in the continuity of the trackway and successive work carriers are able to proceed without interruption and skip over any work carrier which has been lowered into a work station. Thus the withdrawal of one or more work carriers from the trackway does not act to delay the transfer of other carriers.

The elevator may be individually motor driven or operated by an automatic clutch mechanism from a master shaft. Alternatively, the elevators may be piston operated by air or hydraulic pressure. In any case, down and up control may be effected by an adjustable down switch for the motor or clutch, or by an adjustable motor timer, valve or cam for air or oil. The elevation of a carrier while another is passing over can be prevented by an electrical lockout for the motor, a mechanical or electrical lockout for the clutch or valve lockout for the air or oil supply.

While the stations have been shown with uniform spacing therebetween, it will be appreciated that the spacing may be varied as desired and the elevator spacing adjusted accordingly. Elevator stations can be separated by long sections of fixed track with a continuous chain or cable conveying motion to the next station for pick-up by the reciprocating transfer. Any configuration of complete cycle can be arranged as long as the loop is closed for the return of the carriers.

For each forward stroke of the chain 34, the pusher finger 30 advances a trolley 20 from one work station to the next. The trolley is halted by a pivotally mounted latching stop 39 when it occupies a center position on the rail segment 17 above the appropriate work station. As will be explained in greater detail in connection with Figs. 7 and 8, stop 39 is acted upon by a latching mechanism such that it locates and centers the carrier during the transfer interval but it is withdrawn during the indexing operation to permit the advance of the carrier on the rail.

Figures 3A, 4, 5, 6:
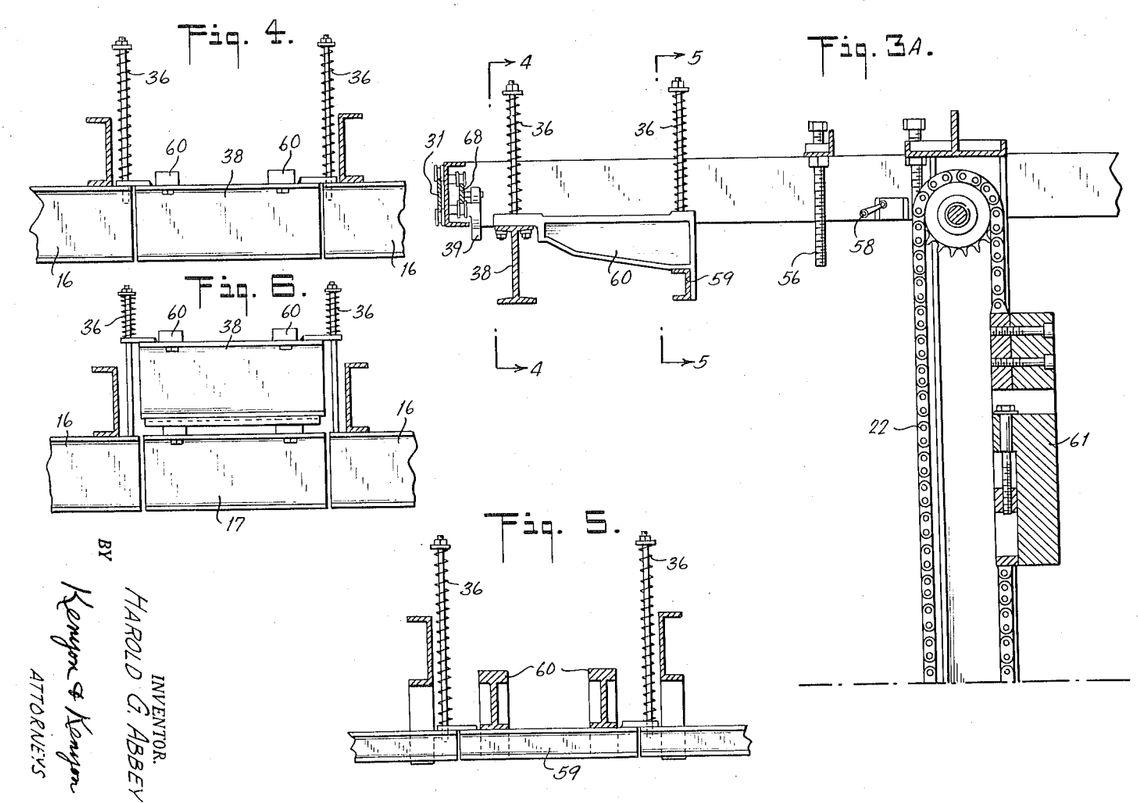
Figs. 3A and 3B are a sectional view taken along lines 3—3 in Fig. 2 and showing one of the work carriers when lowered by an elevator into a working tank.
Fig. 4 is a sectional view taken along lines 4—4 in Fig. 3.
Fig. 5 is a sectional view taken along lines 5—5 in Fig. 3.
Fig. 6 is the same as Fig. 4 save that the substitute rail segment is shown displaced by the transfer rail segment.
Figure 3B:
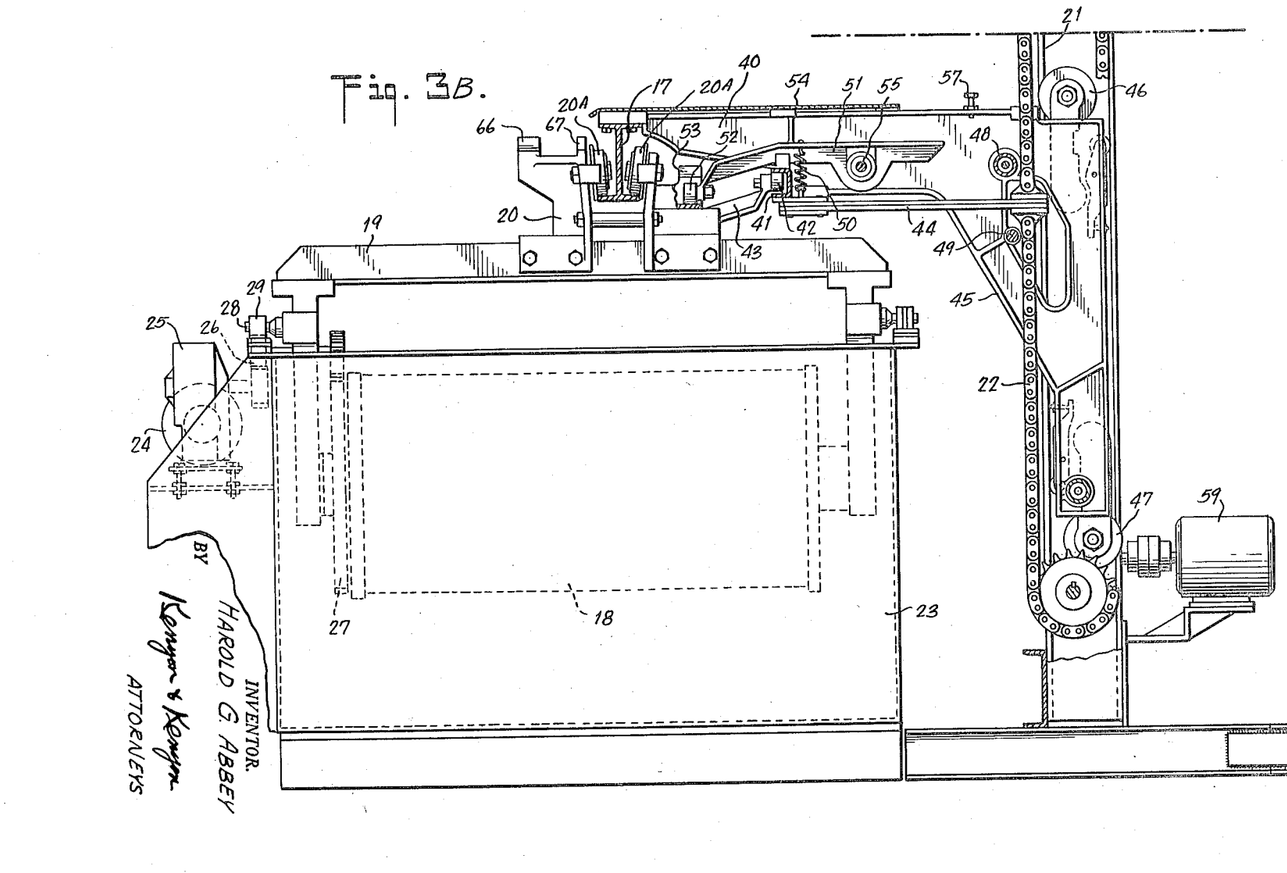

The details of the elevator and of the work carrier may best be seen in Figs. 3A and 3B. The monorail transfer segment 17 is mechanically coupled by a bracket 40 to an auxiliary stabilizing rail segment 41 having a U-shaped cross-section for accommodating a roller 42 rotatably mounted on an arm 43 extending laterally from trolley 20. The auxiliary rail segment is part of an auxiliary track parallel to and extending the full length of the monorail and acts to prevent sidewise swing or play of the trolley 20 about the monorail.

The transfer rail segment and auxiliary rail segment assembly 17, 40 and 41 is supported at the end of a leaf spring 44 connected to and projecting from the elevator chain 22. Further support for the assembly is provided by a rigid cantilever frame 45 to which are secured guides 46 and 47. Flexure of leaf spring is limited by stops 48 and 49. A cover plate 54 is provided on top of frame 45.

To hold the work carrier in position when it is lowered into the tank, a rocker arm 51 is provided which is pivotally mounted on a support 55 and downwardly biased by a spring 50. A roller 52 is secured to the end of the rocker 51 and is receivable within a suitable socket 53 on the rear side of trolley 20. When the elevator lifts the carrier to its track position, the rocker arm 51 abuts a set screw 56 (Fig. 3) which swings the arm about pivot 55 and lifts roller 52 out from socket 53, thereby releasing the trolley for further movement.

Thus the removable segment is self-aligning by reason of the mechanical design and is maintained in alignment during elevation or lowering by the elevator frame, guides, rocker arm and leaf spring arrangement.

Also provided on top of frame 45 is a stop button 57 which when the carrier is lifted to track position strikes a limit switch 58a (Fig. 3A) switch 58 in turn acts to cut off the motor 59 which drives the elevator chain 22 through suitable gear means. A similar limit switch arrangement (not shown) is employed at the lower end of the elevator so that the elevator operation is arrested at either extremity of its movement. Elevator balance is effected by means of a counterweight 61 secured to chain 22.

As shown in Fig. 3A and in Figs. 4 to 6, the substitute rail segment 38 is part of an assembly constituted by an auxiliary rail segment 59 which is parallel to segment 38 and interconnected therewith by a bracket 60. When the transfer segment 17 assembly is lowered by the elevator, the substitute assembly is urged downwardly into place to provide a complete duplication thereof in the trackway, so that continued carrier movement is in no way impaired. Suitable guide and stop means may be provided to ensure registration of the substitute segment with the fixed track.

Figure 7:
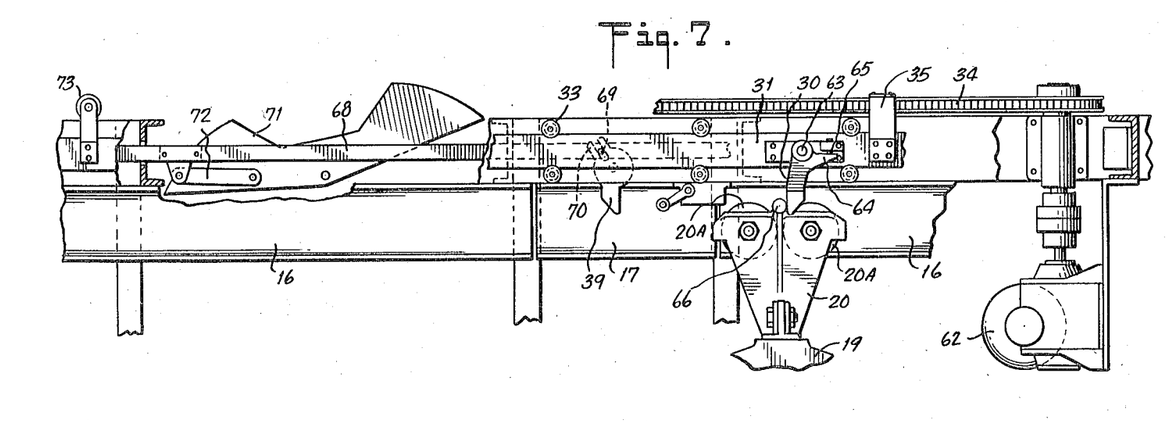
Fig. 7 is an enlarged detail of the conveyer track and the latching mechanisms for the work carrier.
Figure 8:
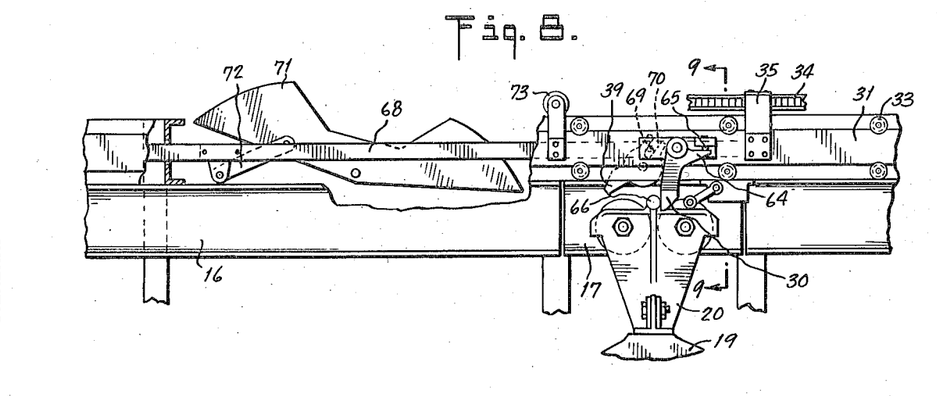
Fig. 8 is the same as Fig. 7, save that in this instance the carrier is centered on the transfer segment.
Figure 9:
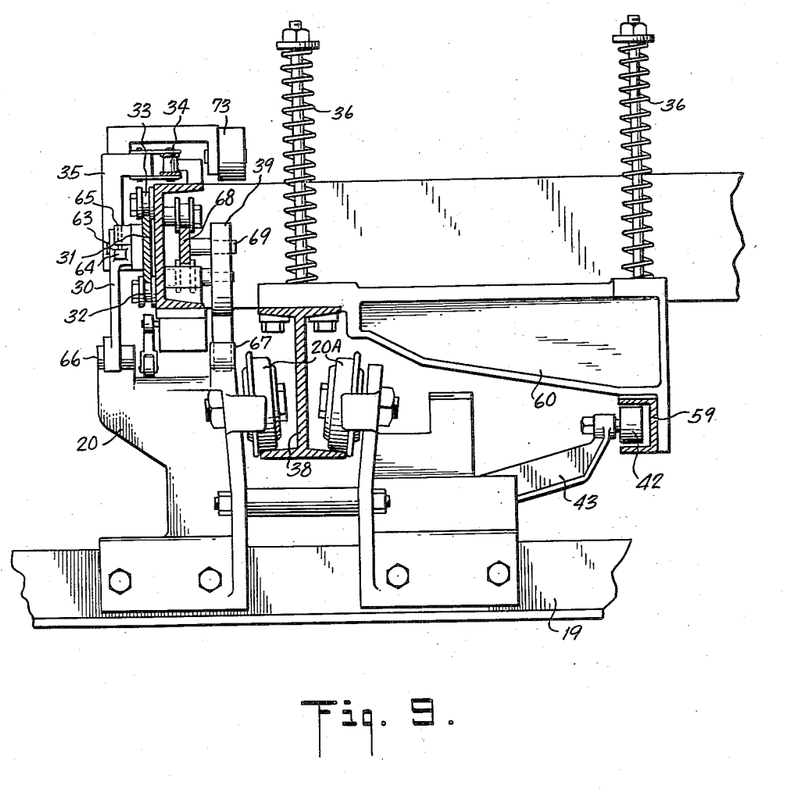
Fig. 9 is a sectional view taken along lines 9—9 in Fig. 8.

The pusher and latching mechanism for the work carriages may best be seen in Figs. 7, 8 and 9. As previously explained, the pusher fingers 30 are pivotally mounted on an actuator bar 31 which is driven reciprocally by chain 34 to effect a stepping action shifting the carriers from station to station. Chain 34, as shown in Fig. 7, is driven by a motor 62 through a suitable reversing mechanism.

Each pusher finger 30 is mounted on actuator bar 31 by a pivot pin 63 and includes a lateral extension 64 which engages a stop 65 so that the finger is free to swing only in the clockwise direction. Thus when the pusher finger is driven toward the left, the finger impinges on knob 66 projecting upwardly from trolley 20 and acts to drive the trolley in the same direction. When, however, the finger is shifted toward the right, it will swing over the knob to clear the trolley.

In Fig. 7, the trolley 20 is shown as it approaches the transfer rail segment 17. To ensure that the trolley is halted at the exact center of the segment, it is essential that the pivoted latching stop 39 be oriented so as to impinge a knob 67 projecting upwardly from the trolley. The angular position of stop 39 is controlled by a movable strip 68 having a pin 69 projecting therefrom which rides in a slot 70 formed in the stop, such that when the strip 68 is shifted to the left, the stop is vertically aligned to block trolley movement as shown in Figs. 7 and 9, but when the strip is shifted to the right, the stop is rotated and sufficiently elevated to clear knob 67, as shown in Fig. 8.

The shift of strip 68 is automatically controlled in accordance with the direction of movement of the actuator bar 31 by means of a butterfly shaped cam 71 which is centrally pivoted and is eccentrically coupled to strip 68 by a link 72. A follower 73 is attached to actuator bar 31 and is positioned to ride the surface of cam 71 such that when the bar 31 is driven to the left to advance the trolley to the next station, the follower after completing its traverse of the cam leaves the cam with its right wing portion extending upwardly, as shown in Fig. 7, whereby the stop 39 is oriented to intercept the trolley when it arrives at the center of the rail segment. But when the actuator bar 31 is driven in the reverse direction, the follower after completing its traverse of the cam leaves it with its right wing portion depressed as shown in Fig. 8, whereby the stop 39 is inoperative to permit the trolley to advance when next the actuator bar is driven toward the left. In this manner centering of the trolley on the track segment is ensured. The same result may also be accomplished by other means, such as electromagnetically-actuated plungers whose operation is controlled in accordance with the requirements of carrier advance.

In the embodiment of the invention described in connection with Figs. 1 to 9, the substitute rail segment which replaces the removable segment when the latter is lowered to bring the work to an operating station, is normally disposed vertically above the removable segment and is brought down by gravity. The invention is by no means limited to the physical arrangement, for it is also possible to introduce the substitute segment laterally by a sliding motion or by other mechanical expedients causing the substitute to take the place of the removed segment and to close the gap in the trackway.

Figure 10:
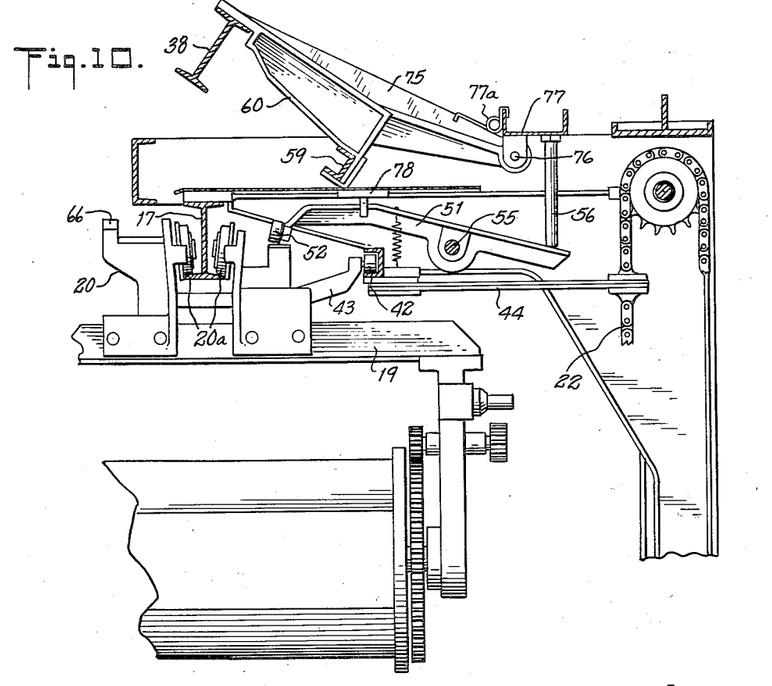
Fig. 10 is a front elevational view of another embodiment of the invention in which the substitute segment is pivotally mounted, the substitute segment being shown out of operation.
Figure 11:
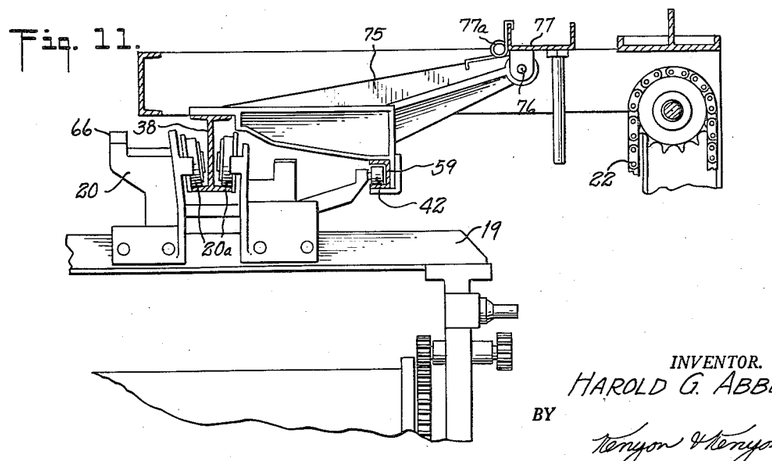
Fig. 11 is the same as Fig. 10 except that the substitute segment is shown in operative position.

Alternatively, as shown in Figs. 10 and 11, the substitute rail segment may be pivotally supported above the removable segment and so arranged that when the removable segment is withdrawn from the trackway, the substitute is swung into place to maintain the flow of carrier traffic.

In the arrangement shown in Fig. 10, the removable rail segment 17 is resiliently supported by the leaf spring 44 connected to and projecting from the elevator chain 22, viz much in the manner shown in Fig. 3B. To hold the work carrier in its proper position when it is lowered into the processing tank, rocker arm 51 bearing the centering roller is receivable within a socket on the rear side of track trolley 20. The substitute rail segment 38 is mounted on a bracket 60 which is supported on an arm 75 pivotally mounted by a bearing 76 on a rigid channel member 77, the arm being downwardly biased by a spring 77a.

When the removable segment 17 and the trolley load carried thereby is lowered by the elevator, the substitute assembly is swung downwardly into place, as shown in Fig. 11, to provide a complete duplication thereof in the track path so that continued carrier movement toward other stations is in no way disrupted. When the removable segment 17 is lifted to its track position by the elevator the rocker arm makes contact with the downwardly projecting set screw 56, causing the arm to rock about pivot 55. As a result, pusher plate 78 mounted on top of the rocker arm acts to raise the substitute segment out of the track so that it assumes the inoperative inclined position shown in Fig. 10.

In every other respect save for the substitute segment arrangement, the setup in Figs. 10 and 11 may be identical with that shown in Figs. 1 to 9 and may include the same work carrier pushing and latching mechanisms.

Figure 12:
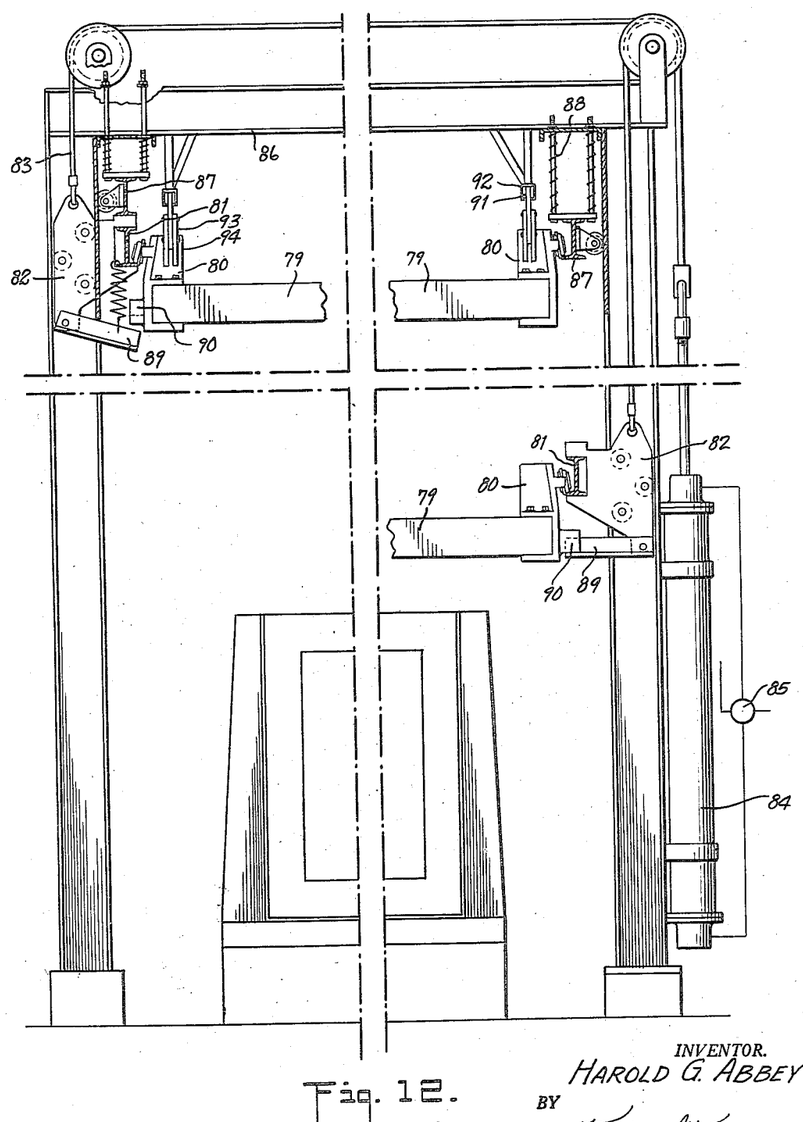
Fig. 12 is an elevational view of a third preferred embodiment of a carrier in accordance with the invention.
Figure 13:
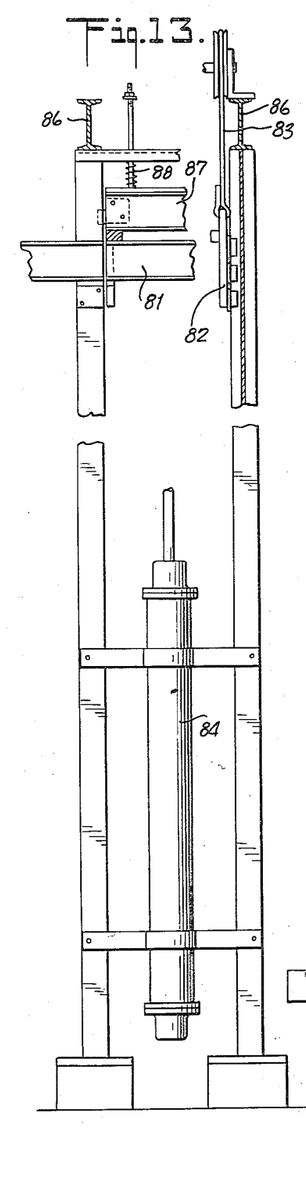
Fig. 13 is a side view of the apparatus shown in Fig. 12.

For large straight line cell plating or so-called bumper operations, it may be desirable to support the work carrier with a heavy load thereon between two parallel rails forming a double trackway. Thus, as illustrated in Figs. 12 and 13, a horizontal work holding rack 79 is supported at either end by trolleys 80 having wheels riding on the flanges of the tracks. Fig. 12 is broken into two portions showing different operating conditions, that on the left indicating the rack position when the substitute segment is inoperative, and that on the right showing the rack as lowered by an elevator, the substitute segment then being inserted in the trackway.

Looking first to the left portion of Fig. 12, it will be seen that trolley 80 rides along a removable rail segment 81 which is supported by a bracket plate 82 connected to the cable or chain of an elevator incorporating an air pressure system including a cylinder 84 and a piston 84a reciprocable therein. Operation of the elevator is controlled by a four-way double-acting valve 85 which is adapted to lead air into the cylinder in a desired direction to raise or lower the elevator. Obviously any form of elevator or jack arrangement may be used within the context of the invention, with any form of air, hydraulic or electric power.

Mounted vertically above the removable segment 81 and supported below a cross frame member 86 is the substitute rail segment 87 which, when the elevator takes out the removable segment, as illustrated at the right side of Fig. 12, is urged by helical springs 88 to occupy the resultant gap and thereby maintain track continuity.

To insure centering of the rack carrier 79 a locking arm 89 is pivotally supported at the lower end of elevator bracket 82, the arm being receivable within a suitable slot 90 in a nose projecting from trolley 80. Movement of the trolley 80 along the track is effected by a chain 91 movable in a guide 92 supported from cross member 86.

Figure 14:
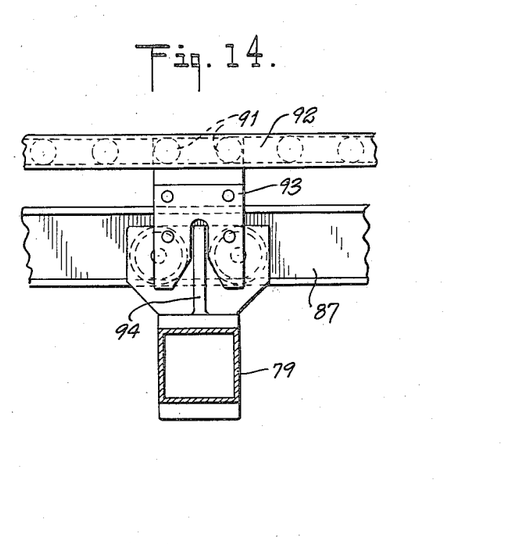
Fig. 14 is a detail of the pusher device for the third embodiment.

Dogs 93 are attached to chain 91, as shown separately in Fig. 14, the dogs being adapted to engage suitable ridges on the trolley whereby movement of the chain is transmitted to the trolleys to effect indexing of the rack. The processing is carried out in tank 94 disposed below the removable segment. It is to be understood that the substitute segment may, if desired, be mounted pivotally in the manner shown in Figs. 10 and 11.

Figure 15:
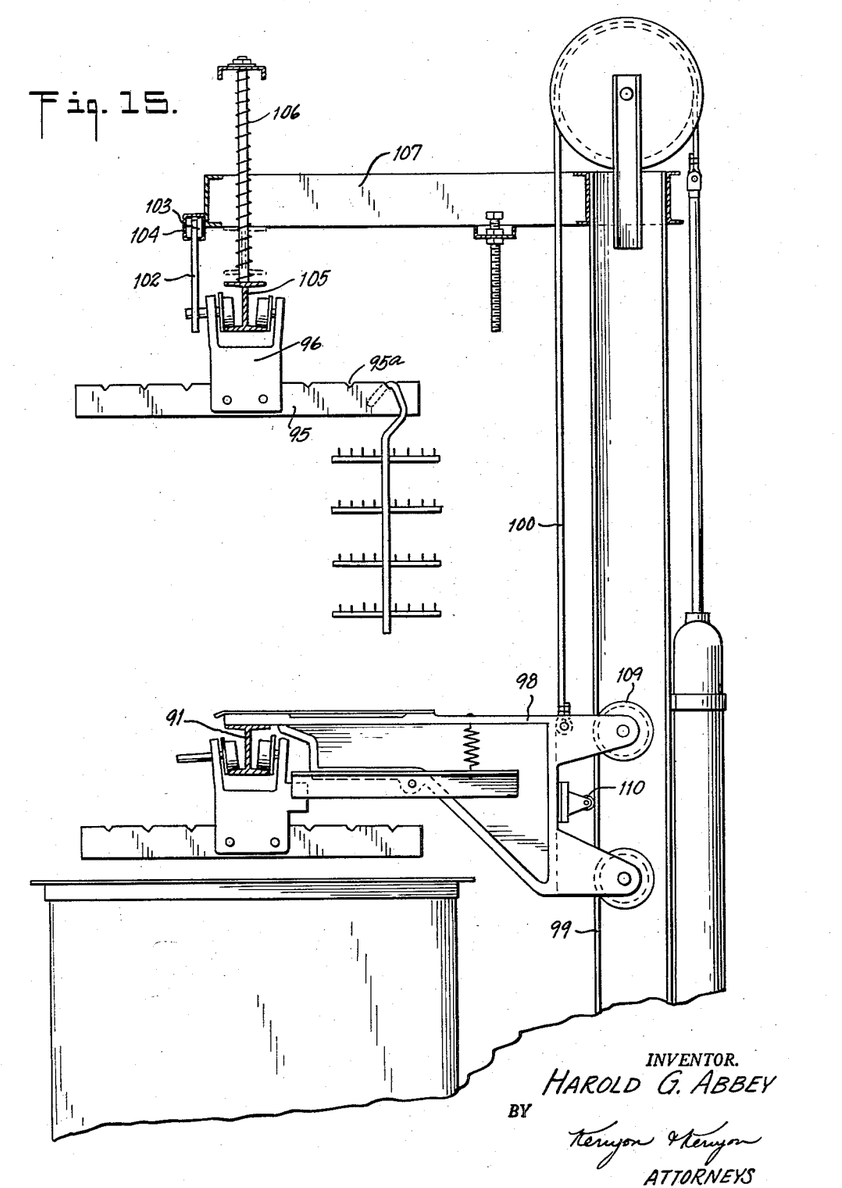
Fig. 15 is an elevation view of a fourth embodiment of the invention.

Fig. 15 illustrates a heavy duty rack plating conveyer in which the horizontal rack 95 is directly attached to a trolley 96, the rack having notches 95a in the upper side thereof to accommodate work hangers for immersion of the work pieces. The removable flanged track is supported by a cantilever elevator bracket 97 which is raised or lowered along a vertical frame 99 by means of a cable 100 operated by a hydraulic cylinder 101 in the conventional manner.

The trolley 96 is driven along the trackway by a pusher dog or flipper 102 connected to a chain 103 operating in a guide tube 104. The substitute rail segment 105 is resiliently supported by means including spring 106 below a fixed cantilever beam 107 projecting from the upper end of frame element 99. To center the trolley, a lock centering device 108 is pivotally mounted on the cantilever bracket 97, the device being received in a suitable recess in the trolley. The movement of elevator bracket 98 is stabilized by means of a pair of wheels 109 riding on the inside wall of frame 99 and a smaller wheel riding on the outside wall.

Figure 16:
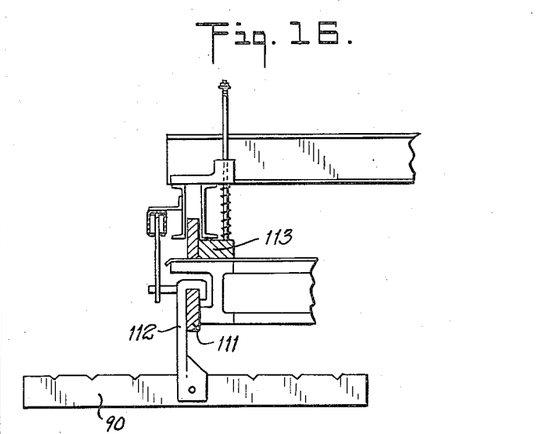
Fig. 16 is a view of a fifth embodiment of the invention.

A modification of the arrangement in Fig. 15 is shown in Fig. 16 where in place of a double flange track a so-called meat conveyor rail segment 111 is provided which is removable, the carrier 112 being in the form of a sliding hook to which the rack 95 is attached. Pusher dogs 102 effect movement of the carrier, the dog being driven by an indexing chain or a reciprocating transfer mechanism. A substitute segment 113 is provided similar to the removable segment and disposed vertically thereabove, the substitute segment falling downwardly into place when the removable segment is lowered to carry the work into the processing tank. This arrangement is particularly useful in medium duty plating operations.

Figure 17:
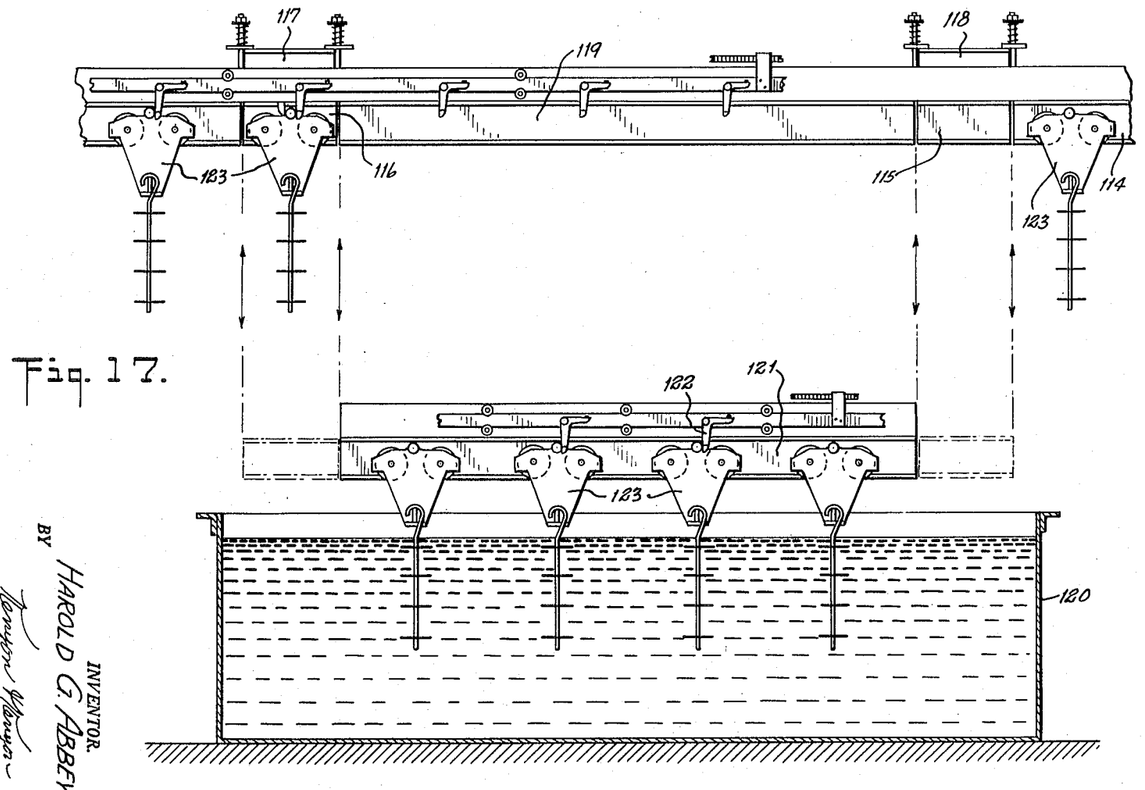
Fig. 17 is a view of a sixth embodiment of the invention adapted for multiple cell processing.

Multiple station cell processing in accordance with the invention is illustrated somewhat schematically in Fig. 17 wherein the overhead track may be substantially identical with that in Fig. 2 and is constituted by a regular track 114 having inserted therein two removable track segments 115 and 116 above which are substitute segments 117 and 118, respectively. Between the two removable segments is a stationary skip transfer section 119. Below the overhead track is a multiple station cell process tank 120. Suspended above the tank is an auxiliary track section 121 which is vertically aligned with the skip transfer section 119. The auxiliary track section is provided with pusher elements 122.

In operation, the removable segment 115 carrying a work carrier 123 is lowered by an elevator to a level in registration with auxiliary track 121 and the work carrier is then transferred thereto by reciprocal movement of the pusher element on the auxiliary track. Work carriers are advanced step by step toward the left on the auxiliary track for processing in the tank. An elevator brings the removable track segment 116 into registration with the other end of the auxiliary track and the carrier with the completed work is pushed thereon for return to the regular track. In the course of this operation other carriers may skip over the tank via the skip transfer section 119.

Where a plurality of work stations adjacent to one another requires the same processing time (in down position), the several station elevators may be lowered or lifted simultaneously with a single hoisting device.

In place of roller 52, shown in Figs. 3A and 3B, when the nature of the work is such as to require electrically "live" entry to the process, a conductive rod or finger can be used to engage a V-shaped type of socket to effect current transfer to the barrel or rack. In fact, in the rack type of machine shown in Fig. 15, this expedient would be the preferred means for energizing the work.

In any power and free system of conveying wherein a power chain type conveyer pushes or pulls by means of open dogs a trackway supported load on slide or wheel trolleys, the inclusion of a replaceable segment elevator at any point in the system will allow removal from the line or sequence of the conveyed load for any purpose such as processing, finishing, inspection, testing, sampling, etc. This is effected without interrupting the continuity of the conveyer system as disclosed herein. Similarly, the "taken-out" load can be reinserted in the first available gap in the series by means of the same device. This can be automatically accomplished by proper cam and position switches, or manually as desired.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A conveyer structure comprising a substantially horizontal work carrier trackway having at least one segment bodily removable therefrom, an elevator coupled to said removable segment to lower the position thereof to a processing position thereby leaving a gap in said trackway, a substitute track segment dimensioned to close said gap, and means responsive to removal of said removable segment to cause said substituted segment to be bodily shifted to take the place thereof to restore the continuity of said trackway.

2. An automatic conveyer structure comprising a substantially horizontal overhead track, at least one trolley-supported work carrier suspended from said track, said track including at least one removable segment, an elevator for supporting said removable segment to said track and adapted bodily to withdraw said segment from said track and to lower same to a processing position thereby causing a gap to form in said track, a substitute segment, and means automatically inserting said substitute segment bodily in said track to replace the withdrawn removable segment and thereby to restore the continuity of said track.

3. A conveyer structure comprising a plurality of work carriers, a substantially horizontal overhead track for conveying said carriers to various work stations disposed below said track, said track including removable rail segments vertically aligned with said stations and bodily removable from said track, separate elevator means operatively coupled to each of said removable segments to lower same to a respective work station therebelow, thereby leaving a gap in said track, and substitute rail segments normally disposed above said removable segments and adapted to be bodily shifted to replace said removable segments when lowered by said elevator means and thereby restore the continuity of said track.

4. A conveyer structure comprising a plurality of work carriers, an overhead track for conveying said carriers to various work stations disposed below said track at spaced positions, said track including removable transfer rail segments vertically aligned with said stations, periodically-actuated pusher means to impart stepwise movement to said carrier to transfer same from station, a separate elevator for supporting each transfer segment and adapted to lower same with a carrier thereon to a respective station for processing thereat, a substitute section normally disposed above said transfer section, and means automatically inserting said substitute section in said track when said transfer section is removed therefrom to maintain the operative continuity of said track.

5. A conveyer structure for a metal plating machine comprising a plurality of work carriers, an overhead track for conveying said carriers to various rinsing and plating stations disposed below said track at spaced positions, said carriers including a trolley riding on said track and a barrel suspended below said trolley for containing articles to be plated, said track including removable transfer rail segments vertically aligned with said stations, a separate elevator for supporting each transfer segment and adapted to lower same with a carrier thereon to a respective station for processing thereat, a substitute segment normally disposed above said transfer segment, and means automatically inserting said substitute segment in said track when said transfer segment is removed therefrom to maintain the operative continuity of said track whereby other carriers may skip over the lowered carrier for processing at other stations.

6. An automatic conveyer structure comprising an overhead track, a plurality of trolley-supported work carriers suspended from said track and movable thereon in a given direction, said track including a plurality of removable transfer rail segments positioned in vertical alignment with a like plurality of work stations, means to push each trolley in a stepwise manner along said track from one segment to a next segment, whereby the carrier is aligned with a respective station, a separate elevator for supporting each removable segment and adapted selectively to lower same to a respective station and to return same to track registration, a substitute rail segment disposed about said transfer segment, and means automatically introducing said substitute segment into said track when said transfer segment is removed therefrom to re-establish the operative continuity of said track.

7. An automatic conveyer structure comprising an overhead monorail track, a plurality of trolley-supported work carriers suspended from said track and movable thereon in a given direction, said track including a plurality of removable transfer rail segments positioned in vertical alignment with a like plurality of work stations, intermittently actuated means to push each trolley in a stepwise manner along said track from one segment to a next segment, a separate elevator for supporting each removable segment and adapted selectively to lower same with a carrier thereon, to a respective station and to return same to track registration, said elevator including a continuous chain and a cantilever frame extending therefrom to support said segment, a substitute rail segment disposed above said transfer segment and spring means automatically introducing said substitute segment into said track when said transfer section is removed therefrom to re-establish the operative continuity of said track.

8. A conveyer as set forth in claim 4 further including holding means to maintain said carrier on said removable segment when said segment is lowered by said elevator and to release said holding means when said segment is returned to said track.

9. A conveyer structure comprising a plurality of work carriers, an overhead track for conveying said carriers to various work stations disposed below said track at spaced positions, said track including removable transfer rail segments vertically aligned with said stations, a separate elevator for supporting each transfer segment and adapted to lower same to a respective station for processing thereat, a substitute segment normally disposed above said transfer segment, means automatically inserting said substitute section in said track when said transfer section is removed therefrom to maintain the operative continuity of said track, means to shift each carrier stepwise from segment to segment on said track for successive alignment with said stations, and releasable stop means to center said carriers on said segments in the interval between said stepwise shifts.

10. An automatic conveyer structure comprising an overhead main track, a plurality of trolley-supported work carriers suspended from said track and movable thereon in a given direction, said track including a plurality of removable transfer rail segments positioned in vertical alignment with a like plurality of work stations, means to push each trolley in a stepwise manner along said track from one segment to a next segment, a separate elevator for supporting each removable segment and a carrier thereon and adapted selectively to lower same to a respective station and to return same to track registration, a substitute rail segment disposed above said transfer segment, means automatically introducing said substitute segment into said track when said transfer segment is removed therefrom to re-establish the operative continuity of said track, and an auxiliary overhead track for stabilizing said trolleys and including segments coupled to said main track segments and removable therewith.

11. In a conveyer provided with a substantially horizontal track having a rail segment bodily removable therefrom, an elevator coupled to said removable segment for lowering said segment below said track thereby leaving a gap in said track, and a pivotally mounted substitute segment adapted to swing into said track to replace said removable segment when lowered by said elevator thereby to restore the continuity of said track.

12. A conveyer structure adapted to effect multiple cell processing in a tank, said structure comprising an overhead main track having at spaced positions first and second removable track segments separated by a skip transfer section, work carriers suspended from said track, said processing tank being positioned below said skip transfer section, an auxiliary track supported above said tank and below said skip transfer section for conveying work carriers through said tank, a first elevator supporting said first removable segment and adapted to lower said segment with a carrier thereon from said main track into alignment with one end of said auxiliary track for transfer of a work carrier onto said auxiliary track, a second elevator supporting said second removable segment and adapted to align same with the other end of said auxiliary track to take on a work carrier and to elevate said segment into registration with said main track, and first and second substitute segments adapted automatically to replace said removable segments when the latter are withdrawn from the main track.

13. A conveyer as set forth in claim 4 further including holding means to maintain said carrier on said removable segment when said segment is lowered by said elevator and to release said holding means when said segment is returned to said track, said holding means being electrically conductive for conveying electrical current from an external source to said carrier.

References Cited in the file of this patent

UNITED STATES PATENTS

| | | |
|---|---|---|
| 2,348,112 | Da Costa | May 2, 1944 |
| 2,451,975 | Rayburn et al. | Oct. 19, 1948 |
| 2,709,010 | Todd | May 24, 1955 |
| 2,710,698 | Hauck et al. | June 14, 1955 |
| 2,716,415 | Davis et al. | Aug. 30, 1955 |
| 2,732,962 | Bullard | Jan. 31, 1956 |
| 2,789,569 | Davis | Apr. 23, 1957 |